United States Patent

[11] 3,556,036

| [72] | Inventor | Paul S. Wells |
| | | 619 1st St., Mount Vernon, Wash. 98273 |
| [21] | Appl. No. | 782,881 |
| [22] | Filed | Dec. 11, 1968 |
| [45] | Patented | Jan. 19, 1971 |

[54] DEEP SEA CARGO VESSEL
6 Claims, 7 Drawing Figs.

[52] U.S. Cl. ................................................. 114/43.5, 114/72
[51] Int. Cl. ........................................... B63b 35/44, B63b 25/00
[50] Field of Search .......................................... 114/72, 73, 74, 43.5

[56] References Cited
UNITED STATES PATENTS
3,191,568  6/1965  Schroeder et al. ............. 114/74
3,403,652  10/1968  Hardy ......................... 114/43.5
3,417,721  12/1968  Vienna ........................ 114/43.5

Primary Examiner—Trygve M. Blix
Attorney—Seed, Berry & Dowrey

ABSTRACT: The invention provides a deep-draft, seagoing, cargo vessel having an exposed top cargo deck adapted to receive a plurality of shallow-draft, cargo barges for transport. The vessel is adapted to be partially submersed to submerge its cargo deck to a depth sufficient to enable cargo barges to be floated into or out of storage position relative to the cargo deck. The vessel is provided with constant tension winches adapted to position the cargo barges into storage position relative to the cargo deck and to maintain their position until the vessel is resurfaced and the cargo barges are firmly seated on the cargo deck for transport.

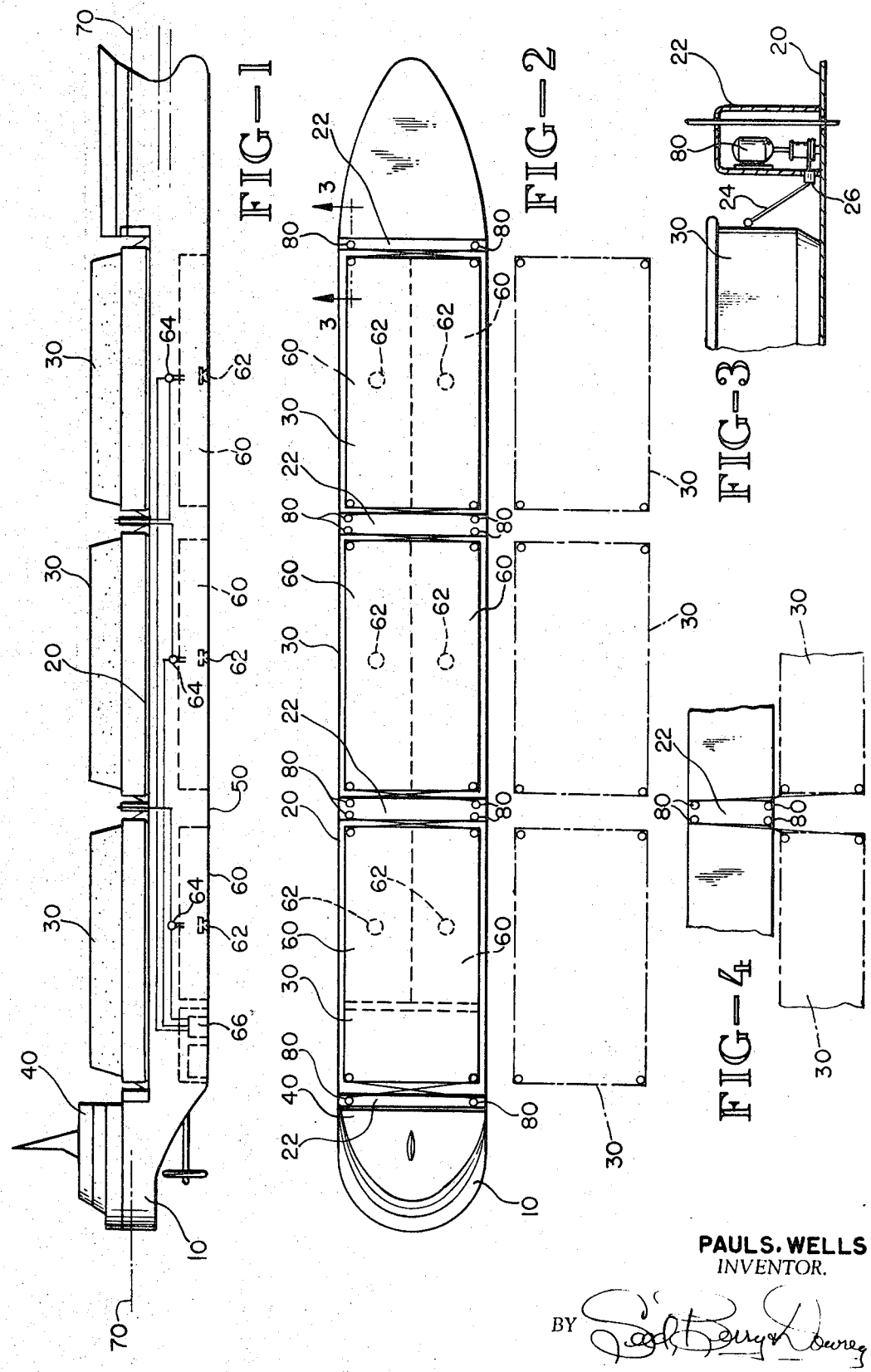

PAUL S. WELLS
INVENTOR.

BY

ATTORNEYS

DEEP SEA CARGO VESSEL

Cargo barge-carrying seagoing vessels have been proposed to provide means whereby the periods of time required in port for off-loading cargo and taking on new cargo could be reduced to a minimum. Such vessels would be adapted to off-load and on-load cargo barges without docking, for example in the middle of a port harbor, with the cargo barges being transported to and from the vessel by tugs. Thus far, such proposals have embodied the concepts of either loading and unloading cargo barges through a stern or side docking compartment or lifting or lowering cargo barges over the side rail, and of transporting the cargo barges within the vessel's hold to or from stacked storage positions. These proposals, therefore, embody two principle undesirable features: firstly, barge lifting and transporting means, such as a real-mounted gantry crane, must be provided on board the vessel; and secondly, relatively small barges on the order of 250 to 200 ton capacity must be employed thereby requiring significant in-port time to unload and load a large vessel having a several thousand ton cargo capacity.

A primary object of the present invention is to provide a seagoing vessel adapted to carry cargo barges without requiring onboard bargelifting and transporting means. Another object is to provide such a vessel wherein large tonnage barges may be employed. A further object is to provide such a vessel wherein an exposed top cargo deck is provided for a plurality of cargo barges and wherein the vessel is partially submersible to a depth sufficient to enable cargo barges to be floated into and out of transporting position relative to the cargo deck. Still another object is to provide such a vessel wherein constant tension winches are employed to properly on-load cargo barges with respect to the submerged cargo deck and to moor the cargo barges in proper position relative to the cargo deck until the vessel is resurfaced and the cargo barges are firmly seated on the cargo deck.

These and other objects and advantages will become apparent from a consideration of the following description in conjunction with the accompanying drawings, of which:

FIG. 1 is a side elevation view of a seagoing vessel embodying the present invention;

FIG. 2 is a plan view of the FIG. 1 vessel;

FIG. 3 is an enlarged view taken along the line 3-3 of FIG. 1; and

Figure 5:
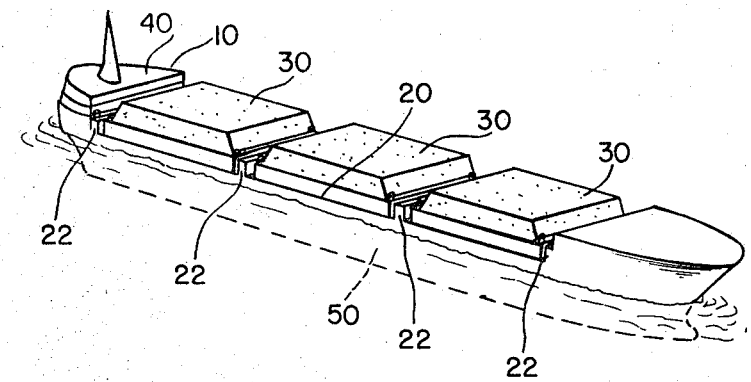
Figure 6:
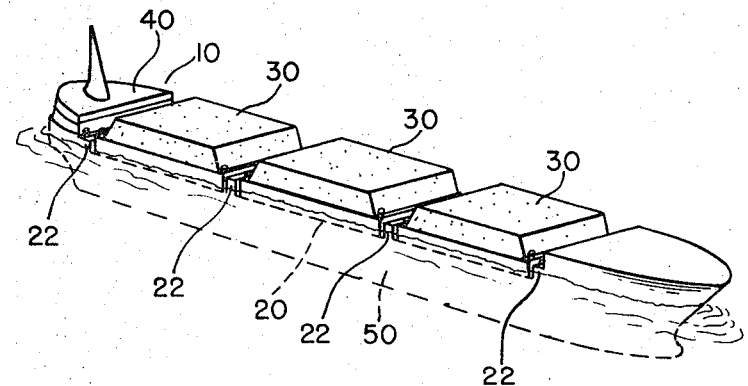
Figure 7:
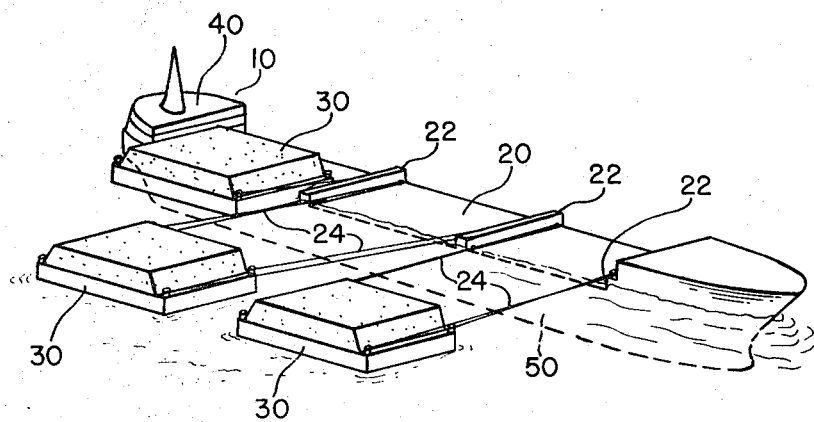

FIGS. 4—7 are sequential perspective views illustrating operation of the vessel of the invention.

In brief, the present invention comprises a seagoing cargo vessel provided with a top cargo deck and adapted to be partially submersed to submerge the cargo deck to a depth sufficient to enable cargo barges to be floated into superimposition therewith. The cargo deck is provided with winch means adapted to tow cargo barges into superimposition with the submerged cargo deck and to moor the barges in that position until the vessel is resurfaced and the barges are firmly seated on the cargo deck.

Referring to the FIGS. an exemplary, partially-submersible cargo vessel 10 is provided with an upper cargo deck 20 adapted to carry a plurality of cargo barges 30 (three being shown), and a deck house 40. The hold 50 of the vessel 10 is provided with a plurality of ballast tanks 60 adapted to be filled with sea water to submerse the vessel to a level indicated by the line 70-70 which submerges the cargo deck 20 to a depth slightly greater than the loaded draft of barges 30. The cargo deck 20 is provided with a plurality of winches 80 adapted to position the barges 30 over the cargo deck 20 when the vessel is submersed and to moor the barges in that position until the ballast tanks 60 are emptied to resurface the vessel 10 and to firmly seat barges 30 on the cargo deck 20.

The ballast tanks 60 are provided with sea valves 62 remotely controllable to open and close the ballast tank interiors to the sea water. The ballast tanks 60 also provided with suitable means to vent the tanks of air and sea water, such as air supply and vent control valves 64 and related conduiting and compressed air supply and control means 66 adapted to operate in conjunction with the sea valves 62 to supply compressed air to the ballast tanks to force sea water out through the sea valves and to vent compressed air from the ballast tanks to permit sea water to enter through the sea valves. If stability and level trim requirements necessitate transfer of sea water ballast from one tank to another during vessel submersion, vessel raising, or when the vessel is at the surface, suitable sea water ballast transfer means, (including appropriate conduiting and sea water pumps) may be provided to enable either lateral or longitudinal sea water ballast transfer.

The cargo barge winches 80 may be provided on the cargo deck 20 within cargo deck dividing superstructures 22. The deck dividers 22 may be provided completely across the cargo deck to divide the deck into cargo barge sections as shown. One or more constant tension winches 80 are provided at the fore and aft ends of each barge section to draw a barge into superimposition with one of the barge sections when the cargo deck is submerged and moor the barge therein.

In the embodiment shown, two winches are provided at the fore and aft ends of each barge section. Each such winch is mounted by the adjacent dividers 22 such that cable 24, wound on the winch drum, extends through fairleaders 26 mounted at an elevation below the point of attachment 32 to the adjacent barge end and slightly outboard of the barge section. The fairleaders may be mounted such that the respective winches also can be employed to pull the barges out of the superimposition with the submerged cargo deck to facilitate unloading the vessel.

The cargo barges 30 and the cargo deck 20 may be provided with interlocking tie down means to firmly lock the cargo barges to the deck for shipment. Such tie down means could be provided as locking dogs applied to either the barges or the deck and adapted to be extended into engagement with the other. Cable from the constant tension winches 80 also may be employed as transport tie downs. It will be noted that the section of the bow of vessel 10 immediately adjacent the foremost cargo barge will shield that barge against high seas and therefore will simplify barge tie down problems inasmuch as high seas break away forces will be reduced.

The dividers 22 will extend above the vessel submerged water line 70-70 and therefore the vent conduits from the air control valves 64 can be conveniently extended upwardly therethrough as shown in FIG. 3 to enable the ballast tanks to be vented when the vessel is submerged. Alternately, the air control valve vent conduits could be extended through the deck house to an elevation above the water line 70-70.

The method of loading and unloading the vessel of this invention is depicted in FIGS. 4—7. The loaded vessel, once in a port harbor and after the cargo barges have been unlocked from the cargo deck, is partially submersed to a level sufficient to float the cargo barges. Either the cargo deck winches or a barge tug are employed to off-load the cargo barges to positions alongside the vessel and then a barge tug tows the barges to their destination. By employing fore and aft cargo deck winches to unload the barges alongside the vessel, the barges can be evenly pulled away from their moored location. If the vessel is to take on a new load, other cargo barges are towed alongside the vessel while still submersed and cable from fore and aft cargo deck winches are secured to the barges. The barges are then pulled into proper superimposition with the submerged cargo deck and moored therein by the constant tension winches. The vessel is then resurfaced and the cargo barges tied down for shipment.

The constant tension winches will maintain the mooring position of the cargo barges despite fluctuating seas by paying out or taking in cable as dictated by the cable tension levels present in the winches. Therefore, the likelihood of a barge breaking away before the vessel can be refloated is greatly reduced. Furthermore, by reason of the mounting location of the fairleaders 26, the constant tension winches will maintain the positions of the barges as the vessel is resurfaced.

It is believed that the invention will have been clearly understood from the foregoing detailed description of my nowpreferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

I claim:

1. A method of loading a seagoing cargo vessel which comprises the steps of providing a partially-submersible cargo vessel having a cargo deck; providing a cargo barge; submersing the vessel to a level necessary to submerge the cargo deck to a depth below the cargo barge bottom; positioning the cargo barge over the submerged cargo deck and mooring the cargo barge to the cargo vessel by reeving lines from the cargo vessel at locations below the elevation of the points of connection to the cargo barge, and drawing the cargo barge downward relative to the cargo deck under constant line tension conditions as the cargo vessel is resurfaced; resurfacing the cargo vessel to contact the cargo deck with the cargo barge bottom and lift the cargo barge free of the water surface.

2. The method of claim 1 wherein the cargo barge is positioned over the submerged cargo deck by connecting lines from the cargo vessel to the fore and aft ends of the cargo barge.

3. The method of claim 2 wherein the fore and aft lines are winched in substantially uniformly such that the cargo vessel is evenly drawn broadside into position over the submerged cargo deck.

4. A system for transporting loaded cargo barges by sea which comprises a seagoing cargo vessel having an upper cargo deck, ballast tanks in the hold and means for filling the ballast tanks with sea water to submerse the vessel to the extent necessary to submerge the cargo deck, and for emptying the ballast tanks to resurface the vessel, a deck house extending above the cargo deck sufficiently to remain above water when the vessel is in a submersed condition; a cargo barge having a shallow draft and adapted to be floated over the cargo deck when the vessel is in a submersed condition; winch means adapted to hold the cargo barge in position over the cargo deck when the vessel is in a submersed condition and until the vessel is resurfaced; said winch means comprising a plurality of constant tension winches mounted by the vessel with lines wound thereon and adapted to be secured to fore and aft ends of the cargo barge and adapted to be tensioned to a predetermined degree to maintain the position of the cargo barge over the cargo deck when the vessel is in a submersed condition; and means mounted by the vessel to direct the lines upward to the points of connection with the cargo barge such that the constant tension winches will remain effective in positioning the cargo barge as the vessel is resurfaced.

5. The system of claim 4, wherein the cargo deck is divided into a plurality of cargo barge sections and wherein cargo barge winch means are mounted by the vessel such that fore and aft barge-holding lines are extendable to convert to fore and aft ends of a cargo barge to hold the cargo barge in superimposition with a cargo barge section when the vessel is in a submersed condition.

6. A system for transporting loaded cargo barges by sea which comprises a seagoing vessel having a cargo supporting deck, ballast tanks and means for filling the ballast tanks with sea water to partially submerse the vessel to the extent necessary to submerge the cargo supporting deck and for emptying the ballast tanks to resurface the cargo supporting deck, a cargo barge having a shallow draft and adapted to be floated over the cargo supporting deck when the deck is submerged, and winch means for drawing the cargo barge over the cargo supporting deck and for pulling the cargo barge downwardly against the cargo supporting deck for holding the cargo barge on the deck after the cargo supporting deck is resurfaced.